United States Patent Office 2,749,342
Patented June 5, 1956

2,749,342

HETEROCYCLIC N-ADDUCTS

Reginald Auchincloss, New York, N. Y.

No Drawing. Application January 21, 1955,
Serial No. 483,431

7 Claims. (Cl. 260—248.5)

The present invention relates to organic compounds, more particularly to heterocyclic compounds having therapeutic properties.

There has been in use for a number of years acetyl choline usually in the form of the chloride, for the purpose of lowering blood pressure by the dilation of the peripheral vessels and by relaxation of the spasm of smooth muscles. While this compound had some effectiveness, the action thereof was of quite short duration. Probably the reason for this is that it is destroyed by choline esterase. Therefore the utility thereof was considerably decreased and it became necessary in certain cases to give large doses or to administer the same at frequent intervals.

The present invention is intended and adapted to obviate the disadvantages of the acetyl choline and to produce substances which have anti-spasmodic properties, giving prolonged effects.

It is also among the objects of the present invention to provide adducts of hexamethylenetetramine and certain halogen containing organic compounds, which adducts have valuable properties for administration to the animal body.

It is further among the objects of the present invention to provide a simple and effective method of producing such compounds.

In practicing the present invention, there is provided a solution of hexamethylenetetramine in a chlorinated hydrocarbon solvent. Into such a solution is introduced a chlorinated organic compound containing an ethyl group. One type of compound is chloroethylacetate and another type is the dialkylaminoethylchloride. The chlorinated hydrocarbon may have from 1 to 2 carbon atoms and from 2 to 5 chlorine atoms. The solution is heated for a substantial length of time, whereby a reaction takes place with the precipitation of the new compounds constituting the present invention. The reaction which takes place is one of addition, whereby both the chlorine atom and the organic residue are attached to the same nitrogen radical on the heterocyclic ring. Since the ring contains three nitrogen radicals, the reaction product contains three molecules of the chlorinated organic compound.

The compounds are believed to have the following structural formula:

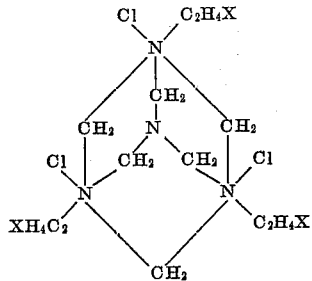

wherein X represents a radical taken from the class consisting of acetoxy and amino.

The following are specific examples of the operation of the invention:

Example 1

One mol. of hexamethylenetetramine with 1 mol. of 2-chloroethylacetate are dissolved in redistilled chloroform. No reaction took place at room temperature and the solution was heated to the boiling point of the solvent with the application of a reflux condenser. After about 40 hours, when a considerable amount of precipitate had been formed, the solution was cooled and filtered. To the mother liquor there was added .22 mol. of 2-chloroethylacetate and the solution heated to the boiling point under the reflux for about three hours. Upon cooling, an additional amount of product was attained and was recovered by filtration. The two products were combined, washed with chloroform and dried. The product was analyzed and was a salt of 3 mols. of 2-chloroethylacetate and 1 mol. of hexamethylenetetramine.

Example 2

A solution was made in redistilled chloroform of 1 mol. of hexamethylenetetramine and 1 mol. of diethylaminoethylchloride. The solution was heated to boiling and refluxed for about two hours, the solution becoming dark during the operation. Thereafter the solution was cooled to room temperature and filtered, whereby a white precipitate was recovered. It was washed with chloroform and dried. An analysis of the product indicates that it is the adduct salt of 3 mols. of 2-diethylaminoethylchloride and 1 mol. of hexamethylenetetramine.

Example 3

Equimolecular proportions of hexamethylenetetramine and 2-dimethylaminoethylchloride were dissolved in purified chloroform. The solution was allowed to stand for about four days at room temperature, during which period a reaction took place, forming a white precipitate. The mass was filtered, washed with chloroform and dried. The mother liquor was heated at the boiling point under a reflux condenser for about three hours. The solution was cooled and filtered, whereby there was recovered an additional quantity of the precipitate which was washed and dried. Analysis of the product showed it to be the adduct salt of 3 mols. of 2-dimethylaminoethylchloride and 1 mol. of hexamethylenetetramine.

Applicant is aware that reactions between quaternary ammonium compounds and halogenated esters have previously been proposed. For instance, there is described a reaction product of tetramethylethylenediamine with the methyl ester of chloracetic acid. However, the reaction product is not at all suitable for applicant's purpose but is apparently useful in the textile industry in various operations in the treatment of fibers and fabrics.

The course of the reaction is quite different from the present invention in that the prior process resulted in an exothermic reaction and the product was of resin-like character. On the other hand, the present products are well-defined crystalline substances. Also the structure of the prior art compounds is such that the acid radical of the ester is attached to the nitrogen whereas in the present invention it is the alkyl group which is so attached.

What is claimed is:

1. Heterocyclic compounds having the following general formula:

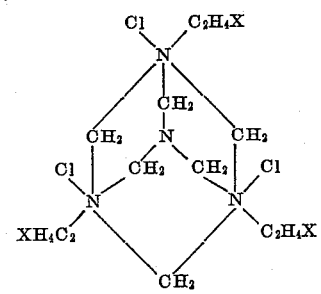

wherein X represents a radical taken from the class consisting of acetoxy and amino.

2. Heterocyclic compounds having the following formula:

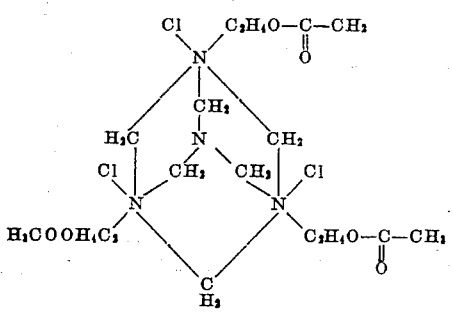

3. Compound according to claim 1 in which X represents the group

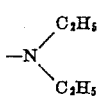

4. Compound according to claim 1 in which X represents the group

5. A method of making heterocyclic compounds which comprises dissolving hexamethylene tetramine in a chlorinated lower hydrocarbon, adding thereto a substance taken from the class consisting of 2-chloroethylacetate, 2-diethylaminoethylchloride and 2-dimethylaminoethylchloride, and heating said solution at about the boiling point of said solvent for a sufficient length of time to form an adduct containing three mols. of said substance.

6. A method of making heterocyclic compounds which comprises dissolving hexamethylene tetramine in chloroform, adding thereto a substance taken from the class consisting of 2-chloroethylacetate, 2-diethylaminoethylchloride and 2-dimethylaminoethylchloride, and heating said solution at about the boiling point of said solvent for a sufficient length of time to form an adduct containing three mols. of said substance.

7. A method according to claim 5 in which the product is filtered off, an additional amount of said substance is added to said solution, and the solution is heated to cause precipitation of additional adduct.

References Cited in the file of this patent
UNITED STATES PATENTS

| | | |
|---|---|---|
| 2,087,565 | Balle | July 20, 1937 |
| 2,193,773 | Sloan | Mar. 12, 1940 |